United States Patent [19]

Saldanha et al.

[11] Patent Number: 5,696,692

[45] Date of Patent: Dec. 9, 1997

[54] CONDITIONAL SELECTION METHOD FOR REDUCING POWER CONSUMPTION IN A CIRCUIT

[75] Inventors: Alexander Saldanha, El Cerrito; Patrick McGeer, Orinda; Luciano Lavagno, Berkeley, all of Calif.

[73] Assignee: Cadence Design Systems, Inc., San Jose, Calif.

[21] Appl. No.: 427,052

[22] Filed: Apr. 24, 1995

[51] Int. Cl.$^6$ .................................. G06F 17/50
[52] U.S. Cl. ..................... 364/489; 364/488; 364/490; 364/491
[58] Field of Search ................ 364/488–491, 364/578; 395/500

[56] References Cited

U.S. PATENT DOCUMENTS

| | | | |
|---|---|---|---|
| 4,942,319 | 7/1990 | Pickett et al. | 307/465 |
| 5,163,092 | 11/1992 | McNesby et al. | 380/28 |
| 5,185,799 | 2/1993 | McNesby et al. | 380/28 |
| 5,189,629 | 2/1993 | Kohnen | 364/490 |
| 5,243,538 | 9/1993 | Okuzawa et al. | 364/489 |
| 5,438,681 | 8/1995 | Mensch, Jr. | 395/800 |
| 5,515,302 | 5/1996 | Horr et al. | 364/578 |

OTHER PUBLICATIONS

A. P. Chandrakasan et al., "Hyper–LP: A System For Power Minimization Using Architectural Transformations," 1992, *Proceedings of the International Conference on Computer Design*, pp. 300–303.

A. Shen et al., "On Average Power Dissipation and Random Pattern Testability of CMOS Combinational Logic Circuits," 1992, *Proceedings of the International Conference on Computer Design*, pp. 402–407.

R. Murgai et al., "Decomposition for Minimum Transition Activity," 1994, *Proceedings of the Low–Power Workshop*, pp. 1–10.

V. Tiwari et al., "Technology Mapping for Low Power," 1993, *Proceedings of the 30th ACM/IEEE Design Automation Conference*, pp. 74–79.

C. Y. Tsui et al., "Technology Decomposition and Mapping Targeting Low Power Dissipation," 1993, *Proceedings of 30th ACM/IEEE Design Automation Conference*, pp. 68–73.

L. Benini and G. De Micheli, "State Assignment for Low Power Dissipation," 1994, *Proceedings of EDAC'94*, pp. 136–139.

M. Alidina et al., "Precomputation–Based Sequential Logic Optimization for Low Power," 1994, *Proceedings of the International Conference on Computer–Aided Design*, pp. 74–81.

Randal Bryant, "Graph–Based Algorithms for Boolean Function Manipulation," 1986, *IEEE Transactions on Computers*, vol. C–35, No. 8, pp. 677–691.

D. A. Huffman, "A Method for the Construction of Minimum Redundancy Codes," 1952, *Proceedings of the IRE*, vol. 40 pp. 1098–1101.

(List continued on next page.)

*Primary Examiner*—Kevin J. Teska
*Assistant Examiner*—Ayni Mohamed
*Attorney, Agent, or Firm*—Townsend and Townsend and Crew LLP

[57] ABSTRACT

A method for reducing power consumed in a circuit, the circuit having at least a first and a second primary input lead, a plurality of gates, and a plurality of edges, the method includes the steps of determining a set of gates in the circuit coupled to the first primary input lead, the set of gates coupled to a set of edges, determining the 1-controllability of each edge in the set of edges; providing a binary OR tree to the circuit; coupling the set of edges to the binary OR tree; providing an AND gate to the circuit; coupling the AND gate to the binary OR tree and to the first primary input lead; providing a binary AND tree to the circuit; uncoupling the first primary input leads from the set of gates; and coupling the binary AND tree to the AND gate, to the binary OR tree, and to the set of gates.

32 Claims, 7 Drawing Sheets

OTHER PUBLICATIONS

A. V. Aho et al., "Algorithms on Graphs", 1974, *The Design and Analysis of Computer Algorithms*, Chapter 5, pp. 171–223.

G. D. Hachtel et al., "Re-Encoding Sequential Circuits to Reduce Power Dissipation," 1994, *Proceedings of the International Conference on Computer-Aided Design*, pp. 70–73.

Alidina et al. "Precomputation-Based Sequential Logic Optimization for Low Power", Proceedings of the Int. Conf. on Comput.–Aid. Des., 1994.

ORIGINAL CIRCUIT

AFTER CONDITIONAL SELECTION

CONDITIONAL SELECTION METHOD FOR REDUCING POWER CONSUMPTION IN A CIRCUIT

FIELD OF THE INVENTION

The present invention relates to methods for synthesizing gate level digital circuits and the circuits derived therefrom and, in particular, methods for reducing the power consumed by the charging of inputs into a digital circuit.

BACKGROUND OF THE INVENTION

With the advent of battery operated computers and hand held digital electronic devices, circuit designers have become more conscious of the need to reduce power consumed by the integrated circuits (ICs) used in their designs.

Various techniques for reducing the power consumed in electronic circuits have been applied at all levels of design. For a survey of generally applicable techniques, attention is directed to "Hyper-LP: A System For Power Minimization Using Architectural Transformations", by A. P. Chandrakasan, M. Potkonjak, J. Rabaey, and R. W. Broderson, *Proceedings of the International Conference on Computer-Aided Design*, pp.300–303, (November 1992), [IEEE 0-8186-3010-8/92].

Logic-Optimization techniques modify well known algorithms for logic optimization such as node simplification and partial collapsing, which are well known in the art. Other works of interest are "On Average Power Dissipation and Random Pattern Testability of CMOS Combinational Logic Circuits", by A. Shen, A. Ghosh, S. Devadas, and K. Keutzer, *Proceedings of the International Conference on Computer-Aided Design*, pp.402–407, (November 1992), [IEEE 0-8186-3010-8/92], discussing the logic-optimization technique of disjoint cover realization; "Decomposition for Minimum Transition Activity", by R. Murgai, R. K. Brayton, and A. Sangiovanni-Vincentelli, *Proceedings of the Low-Power Workshop*, pp.1–10, Napa, Calif., (April 1994) [Dept. EECS, Univ. of Cal. Berkeley], discussing the technique of node decomposition; and "Technology Mapping for Low Power", by V. Tiwari, P. Ashar, and S. Malik, *Proceedings of the 30th ACM/IEEE Design Automation Conference*, pp.74–79, (June 1993), [ACM 0-89791-577-1/93/0006-0074], and in "Technology Decomposition and Mapping Targeting Low Power Dissipation", by C. Y. Tsui, M. Pedram, and A. M. Despain, *Proceedings of the 30th ACM/IEEE Design Automation Conference*, pp.68–73, (June 1993), [ACM 0-89791-577-1/93/0006/0068], both discussing technology mapping to obtain circuits with reduced switching activity.

A problem with logic-optimization techniques is that circuit switching time and propagation delays are often not accounted for in these standard logic optimization algorithms. All of the above techniques are based on a zero-delay model, where only the final stable value on each gate is considered. It remains unclear whether results obtained using the above techniques are related to the actual power consumed in the circuit. As a result, none of these techniques have reported results with an actual significant power reduction.

The State-Encoding approach is based on the observation that a sizable fraction of logic in most circuits is devoted to computing the next state function, as discussed in "State Assignment for Low Power Dissipation", by L. Benini, G. DeMicheli, *Proceedings of EDAC'94*, (1994). As a result, it is reasoned that if neighboring states in the state transition graph differ in very few bits, few transitions will be required on most input-vector changes. Re-encoding of sequential logic circuits to minimize transition activity is described in the paper, "Re-encoding Sequential Circuits to Reduce Power Dissipation", by G. D. Hachtel, M. Hermida, A. Pardo, M. Poncino, and F. Somenzi, *Proceedings of the International Conference on Computer-Aided Design*, pp.70–73, (November 1994), [ACM 0-89791-690-5/94/0011/0070]. A basic problem with state-encoding approaches is that it is often difficult to make strong statements about the transition activity in a circuit when the input-output function and the state code is known but the actual implementation of the Combinational logic circuit is not yet known. This is not to say that this technique cannot be usefully applied in conjunction with the techniques disclosed and claimed herein.

The Pre-Computation technique attempts to reduce power consumption by selectively pre-computing some of the output logic values one clock cycle in advance. The pre-computed values are then used to reduce the transition activity in the next clock cycle. While a few pre-computation architectures have been explored, for instance, "Precomputation-Based Sequential Logic Optimization for Low Power", by M. Alidina, J. Monteiro, S. Devadas, A. Ghosh, and M. Papaefthymiou, *Proceedings of the International Conference on Computer-Aided Design*, pp.74–81, (November 1994), [ACM 0-89791-690-5/94/0011/0074], it appears that for effective power reduction a specific pre-computation architecture must be designed for each circuit class. The technique appears to be more effective on data path circuits with a regular logic structure, e.g., arithmetic. However, the technique is not as effective on control circuits that do not have regular logic structures, i.e., random logic.

A general objection to these approaches is that it is often difficult to estimate either a peak or an average power consumption of a circuit, which are complex functions of both the logical and timing properties of the circuit. Given a delay model based upon timing properties, efficiently determining the logical behavior of circuits over time, under all possible input vectors is a very difficult problem. Thus, one is often forced to rely on timing simulation. However, there is neither a guarantee that the set of input test vectors chosen for simulation is representative of the whole input space nor that the set of input test vectors contains the worst-case vector.

FIG. 1 illustrates typical Shannon graphs. The Shannon graph in FIG. 1 includes a set of nodes, also called switching nodes, each having one or more input edges and two output edges. In the example, the Shannon graph labeled f, 35, has a root node 30 labeled $X_1$ and output edges 40 and 50, labeled $x_1$ and $x'_1$ respectively. Note: x' as used herein is equivalent to $\bar{x}$, the logical complement to x.

A drawback with current circuits is that certain nodes in a circuit may not affect the eventual output state of the circuit. This drawback is illustrated below in the following example. In this example, three nodes are labeled A, B and C, having input states denoted X, Y and Z:

A=X AND Y
B=Z AND Y
C=A OR B

In the case where X=0, Y=1 and Z=1, the output state of A, B and C are as follows: A=0, B=1 and C=1. Now if the input states changes from X=0, Y=1 and Z=1 to X=1, Y=1 and Z=1, assuming a unit delay, node A changes from 0 to 1, node B remains at 1, and node C remains at 1. Since the output for B did not change, the output state of C was independent of the value of A. The final state of A was not needed to determine the correct output of the circuit with respect to node C, because the result of the transition of A from 0 to 1 did not propagate to the node C. Because node A switched without having an impact on node C, the power consumed by the switching of A could have been saved. In larger circuits containing even greater number of nodes in multiple pathways, many transitions do not eventually propagate to the output. Thus, eliminating those components whose transitions do not propagate to the output in a circuit is important.

What is needed in this art is a method for deriving a low power circuit from a Shannon graph. Since transitions depend not only upon logical properties, but also upon timing properties of circuit components, it is desirable in this art to reduce the number of 0 to 1 transitions on switching nodes. In a circuit derived from a Shannon graph, most of the power consumed is due to the charging of gate inputs by primary inputs leads, i.e. input capacitance. Reducing the amount of input capacitance on the primary input leads is thus important.

SUMMARY OF THE INVENTION

The present invention provides a method for reducing power consumption of charging inputs in low-power digital circuits, a circuit derived therefrom, and an apparatus for reducing power consumption.

According to one embodiment of the invention, a method for reducing power consumed in a circuit, the circuit having at least a first and a second primary input lead, a plurality of gates, and a plurality of edges, the method includes the steps of: determining a set of gates in the circuit coupled to the first primary input lead, the set of gates coupled to a set of edges, determining the 1-controllability of each edge in the set of edges; providing a binary OR tree to the circuit; coupling the set of edges to the binary OR tree; providing an AND gate to the circuit; coupling the AND gate to the binary OR tree and to the first primary input lead; providing a binary AND tree to the circuit; uncoupling the first primary input leads from the set of gates; and coupling the binary AND tree to the AND gate, to the binary OR tree, and to the set of gates.

According to another embodiment of the invention a system for reducing power consumed in a circuit, the circuit having at least a first and a second primary input lead, a plurality of gates, and a plurality of edges, the system including a processor and a memory, the system includes: an input device, coupled to the memory for inputting the Shannon graph into the memory; means, coupled to the memory for determining a set of gates in the circuit coupled to the first primary input lead, the set of gates coupled to a set of edges; means, coupled to the memory for determining the 1-controllability of each edge in the set of edges; means, coupled to the memory for providing a binary OR tree to the circuit; means, coupled to the memory for coupling the set of edges to the binary OR tree; means, coupled to the memory for providing an AND gate to the circuit; means, coupled to the memory for coupling the AND gate to the binary OR tree and to the first primary input lead; means, coupled to the memory for providing a binary AND tree to the circuit; means, coupled to the memory for uncoupling the first primary input leads from the set of gates; means, coupled to the memory for coupling the binary AND tree to the AND gate, to the binary OR tree, and to the set of gates; and an output device, coupled to the processor and to the memory for outputting the circuit.

BRIEF DESCRIPTION OF THE DRAWINGS

In order to more fully understand the present invention, reference is made to the accompanying drawings in which.

DETAILED DESCRIPTION OF THE PREFERRED EMBODIMENT

The present invention is directed to reducing power consumption of the charging inputs in low-power circuits.

This patent application is related to and incorporates by reference the subject matter of commonly owned and assigned co-pending U.S. patent application Ser. No. 08/427,031 entitled "Method For Reducing Power Consumption Of Switching Nodes In A Circuit", filed Apr. 24, 1995, by Alexander Saldanha, Patrick McGeer, and Luciano Lavagno, which is directed towards the synthesis of low-power circuits from Shannon graphs which minimize the number of transitions occurring on gates therein which do not propagate to the output so as to reduce overall circuit power consumption.

It should be understood that one considered skilled in this art would readily understand digital logic and digital circuit components and their functionality, concepts underlying a Shannon graph and concepts underlying a Binary Decision Diagram (BDD). See, "Graph-Based Algorithms for Boolean Function Manipulation", by Randal Bryant, *IEEE Transactions on Computers*, Vol. C-35, No.8, pp.677–691, (August 1986), [IEEE 0018-9340/86/0800-0677], incorporated herein by reference.

The presently disclosed invention is preferably applied after well-known decomposition and area recovery techniques are performed on an initial circuit derived from a Shannon graph. These techniques are well-known in the arts and a discussion directed to the specifics is omitted herein. The well-known Huffman algorithm for decomposition is discussed in: "A Method for the Construction of Minimum Redundancy Codes", by D. A. Huffman, in *Proceedings of the IRE*, Vol.40, pps.1098–1101, (September 1952).

SHANNON GRAPHS

Figure 1:
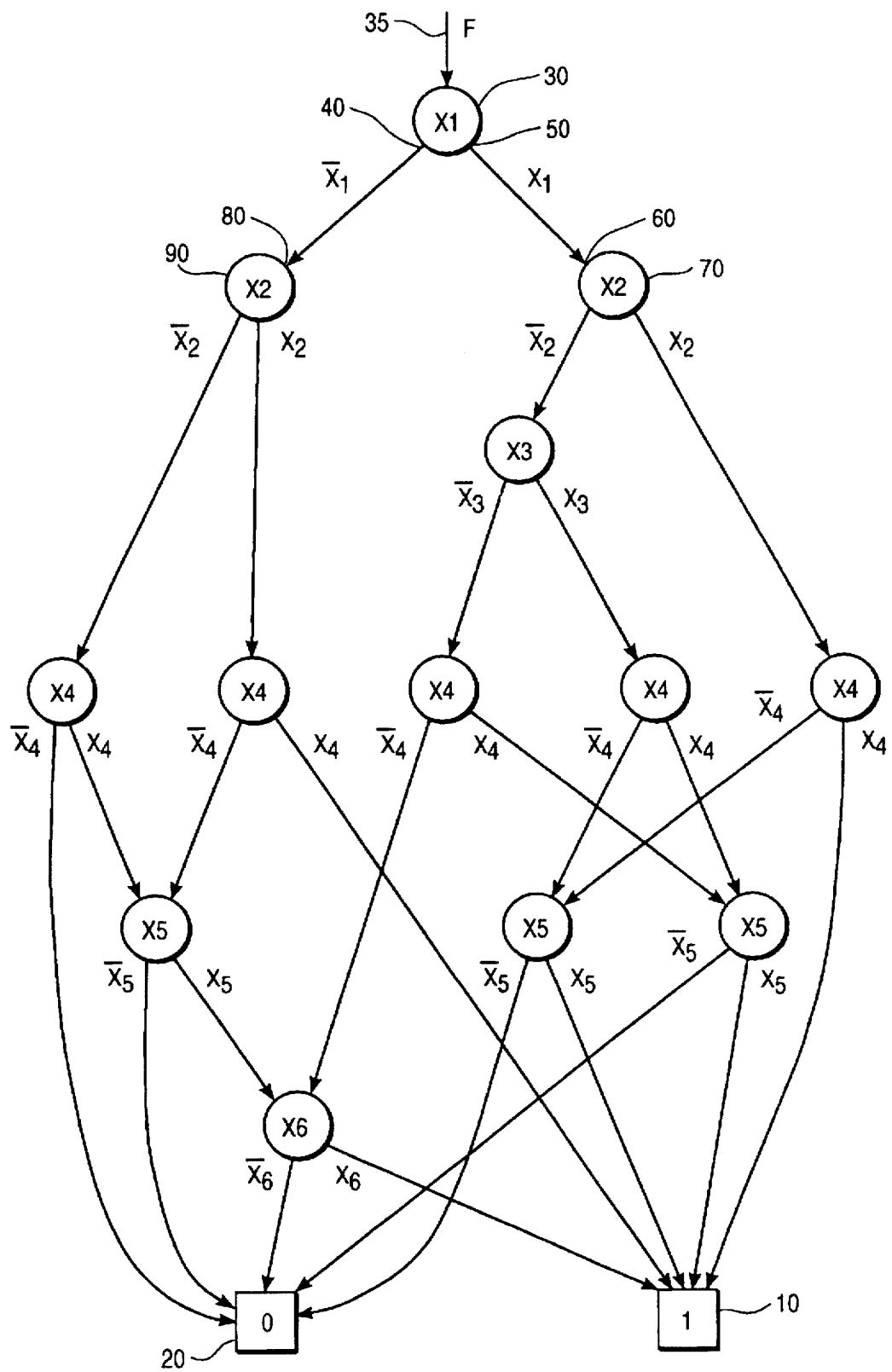
FIG. 1 illustrates a typical Shannon graph.

FIG. 1 illustrates a typical Shannon graph. A Shannon graph is a graphical representation of a function and can be defined more formally by the recursive expansion of the following formula:

$$f = x \wedge f(x=1) \vee x \wedge f(x=0) \tag{1}$$

In the following document x' is equivalent to x, the logical complement to x.

The present invention takes as its starting point a Shannon graph defined recursively by the following properties, with illustrative reference to FIG. 1a:

1. Nodes labeled 1 and 0 are end-terminals, labeled 10 and 20. Either the one end-terminal 10 or the zero end-terminal 20 will be reached, depending on path traversed in the Shannon graph; and
2. A graph of a non-constant function f is a rooted, labeled, binary, directed, acyclic graph with a root node having the following sub-properties:
   i. The out-degree of a root node of the Shannon graph is two, labeled output edges 40 and 50;
   ii. One of the output edges of the root node is labeled x, and the other output edge is labeled x', where x is any variable such that f(x) is not equal to f(x'). This is illustrated by output edges 40 and 50, respectively;
   iii. The output edge x is attached to the input edge of a root node of a Shannon graph for f(x), 60 and node 70; and
   iv. The output edge x' is attached to the input edge of a root node of a Shannon graph for f(x'), 80 and node 90.

If no two nodes in a Shannon graph of f are roots of Shannon graphs of identical functions, a Shannon graph of f is said to be "reduced". A special case of the reduced Shannon graph is that of a binary decision diagram (BDD) which has the property that no path through the reduced Shannon graph contains two distinct edges with the same label. The Shannon graph in FIG. 1 illustrates a BDD.

By convention, the output edge labeled $x_i$ from the node $X_i$ corresponds to the edge traversed if $x_i$ evaluates to 1, and the output edge $x'_i$ corresponds to the edge traversed if $x_i$ evaluates to 0. The same convention and representation is used herein to label a node's output edges and represent the states of the respective output edges.

The user who designs the Shannon graph pre-defines the functions such that the graph produces the desired output states, depending on the values for primary input leads (also known as input vectors). From a circuit derived from such a graph, the present invention derives low-power circuits. Alternatively, the present invention derives low-power circuits from a circuit in which all the gates either transition from a 0 to a 1, or from a 1 to a zero.

SYSTEM CONFIGURATION

Figure 2:
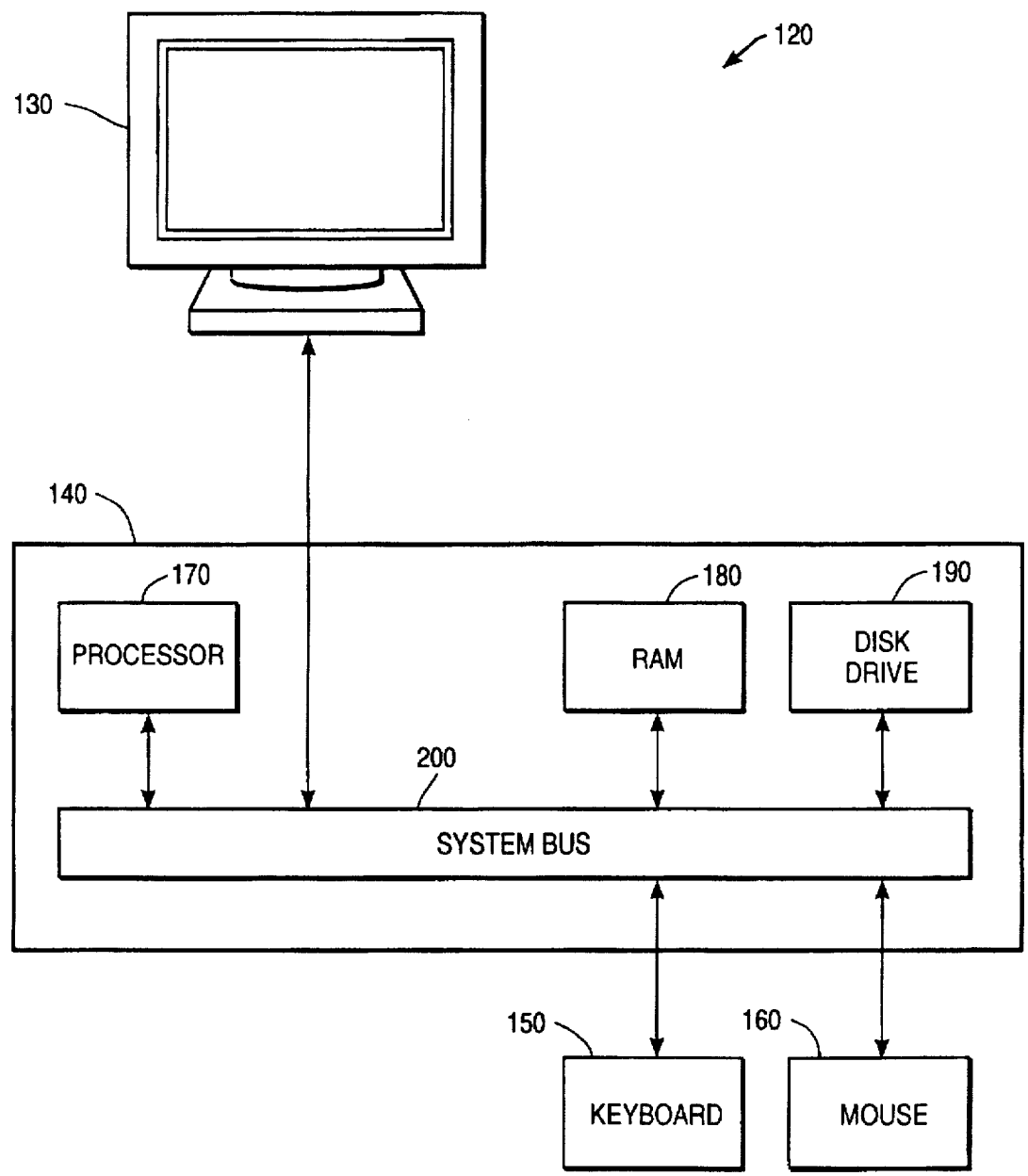
FIG. 2 is a block diagram of a system 120 according to a preferred embodiment of the present invention.

FIG. 2 is a block diagram of a system 120 according to a preferred embodiment of the present invention. System 120 includes a display monitor 130, a computer 140, a keyboard 150, and a mouse 160. Computer 140 includes familiar computer components such as a processor 170, and memory storage devices such as a random access memory (RAM) 180, a disk drive 190, and a system bus 200 interconnecting the above components. In a preferred embodiment, System 120 includes a SPARC-10, 40 MegaHertz based computer, running the UNIX operating system, both from Sun Microsystems, and a low power synthesis module which is part of the Sequential Interactive System (SIS) software available from University of California, Berkeley.

FIG. 2 is representative of but one type of computer system for embodying the present invention. It will be readily apparent to one of ordinary skill in the art that many computer system types and configurations are suitable for use in conjunction with the present invention.

POWER CONSIDERATIONS

A two-input gate realization is utilized herein for estimating power consumption of a circuit. The power consumed by a transition on a particular gate output is directly proportional to the fan-out of that gate, for example, the power consumed by a transition on a gate with a fan-out of number n and the power consumed per gate is P is n*P power. With regard to a Shannon graph, if M denotes the largest fan-in of a node in the Shannon graph, an OR-gate with M inputs for example can be decomposed into a balanced-binary tree of two input OR-gates, thereby yielding an OR-Tree of depth at most $\log_2 M$. For a Shannon graph with n inputs and m output circuits, at most nm AND-gates and $nm(\log_2 M)$ OR-gates can become active when enabled. In the circuit derived from the Shannon graph in the related application and used herein, the circuit is enabled when an ENABLE signal is set to 1, and gates rise to a 1 state. When reset, ENABLE=0, these same gates fall, i.e., return to a 0 state. On a full ENABLE cycle, at most $2nm(1+\log_2(M))$ gate transitions occurs.

In order to increase the power savings realized by the derived circuit of the related patent application, the power expended when the primary inputs change, as just described above, needs to be accounted for. In the worse case, for each input change, a transistor on every AND-gate in the circuit either charges or discharges. Since, according to the related patent application, there exists one AND-gate per edge in the starting graph and two output edges per node, the power consumed by two AND gates needs be accounted for. The worst case total power consumption is:

$$P_{total} = 2nm(1+\log_2(M))P + 2|E|P \qquad (2)$$

|E| is the total number of output edges in the BDD, and P is the power consumed by a single transition on a gate having a single fan-out.

Applying the well-known technique of node duplication with balanced tree decomposition for an OR-gate, at an end-terminal of the above circuit, yields a second upper bound for the total power consumption:

$$P_{total} = 4nmP + 2|E|P \qquad (3)$$

As stated previously, the problem herein is that, on each change in a given primary input lead $x_i$, AND-gates associated with primary input lead $x_i$ must also change. In the instance wherein the number k of AND gates associated with $x_i$ is relatively large this may constitute a significant drain on overall circuit power. The second term of equations (2) and (3) for total power tends to dominate in computation of total power consumption when the number of edges |E| is much larger than the number of primary input leads n, i.e. |E|>>n. It is readily apparent to those skilled in the art that $|E| \leq 2^n$. In such a situation, the power expended when the primary input leads charge up must also be taken into account. The present invention is directed towards this end and achieves this objective by applying what is referred herein to as a conditional selection circuit and method. A conditional selection circuit is constructed and associated with each selected primary input lead and interfaced back into the initial circuit as is described in enabling detail below.

Determining mean power consumption of the circuit in response to an input vector, requires knowledge of the switching probabilities of the various nodes of the selected network. As will be used herein, the term "1-controllability" of a primary input lead is the probability that a primary input lead will be set or switched to one; symbolically, $p(x_i=1)$. Two sets of probabilities are of interest:

1. The probability that a primary input lead $x_i$ will switch, denoted $p_i$, is given by $p_i = 2p(x_i=1)(1-p(x_i=n))$.
2. The probability that an internal gate will switch to 1, "1-controllability", denoted $p_g$ is given by:

(i) The 1-controllability of the ENABLE input, p enable is 1;

(ii) The 1-controllability of the output of an AND gate is equal to the product of the 1-controllability of its inputs, $P_{AND} = P_{input1} * P_{input2}$; and (iii) The 1-controllability of the output of an OR gate is equal to the sum of the 1-controllability of its inputs, $P_{OR} = P_{input1} + P_{input2}$.

CONDITIONAL SELECTION CIRCUIT

Figure 3:
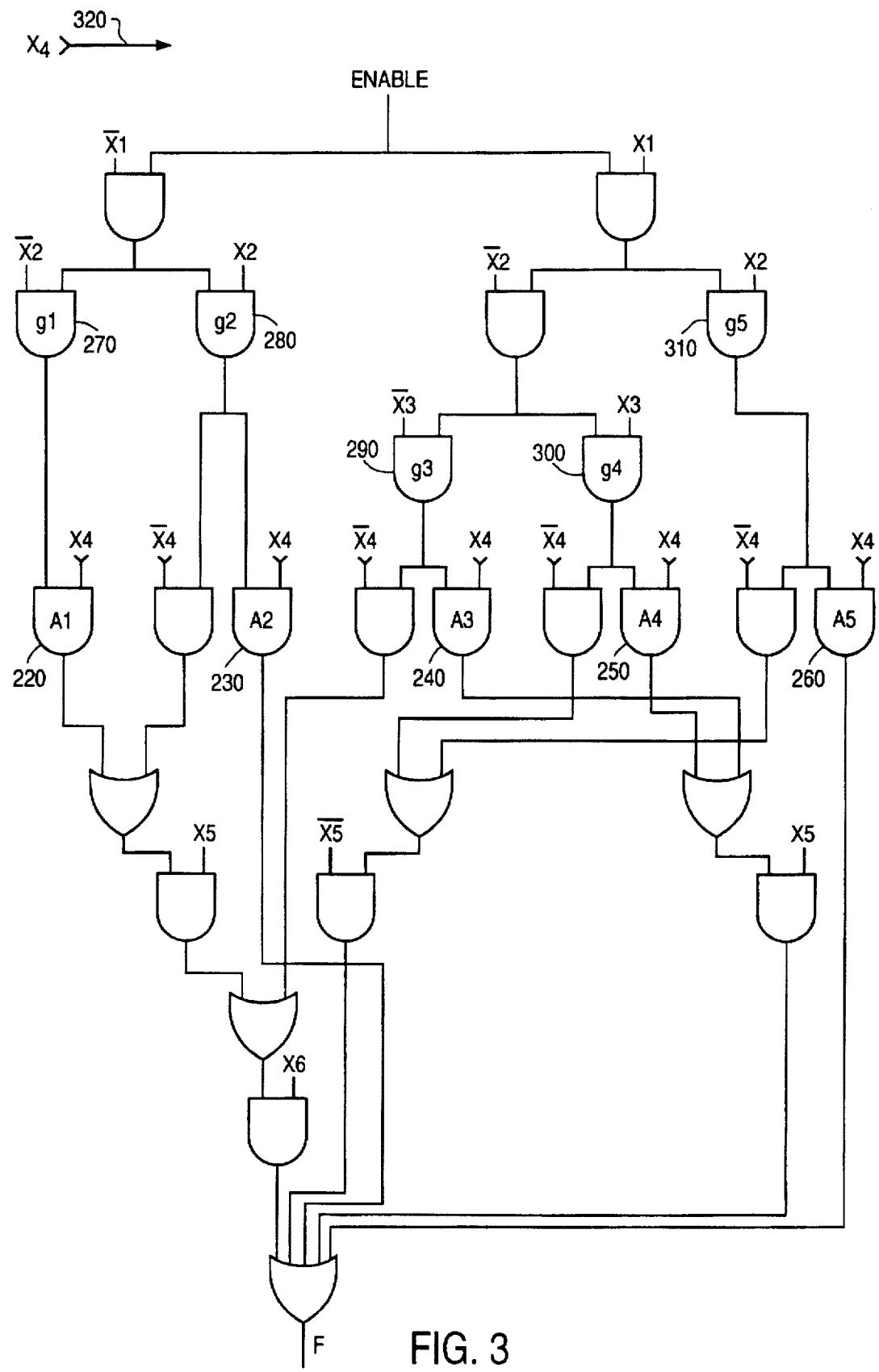
FIG. 3 illustrates a circuit derived from the Shannon graph in FIG. 1, using the techniques disclosed in the cited related patent application.

FIG. 3 illustrates a circuit derived from the Shannon graph in FIG. 1, using the techniques disclosed in the cited related patent application. FIG. 3 includes AND gates A1–A5, labeled 220–260 respectively, gate output signals g1–g5, labeled 270–310 respectively, and primary input lead $x_4$, labeled 320.

Figure 4A:
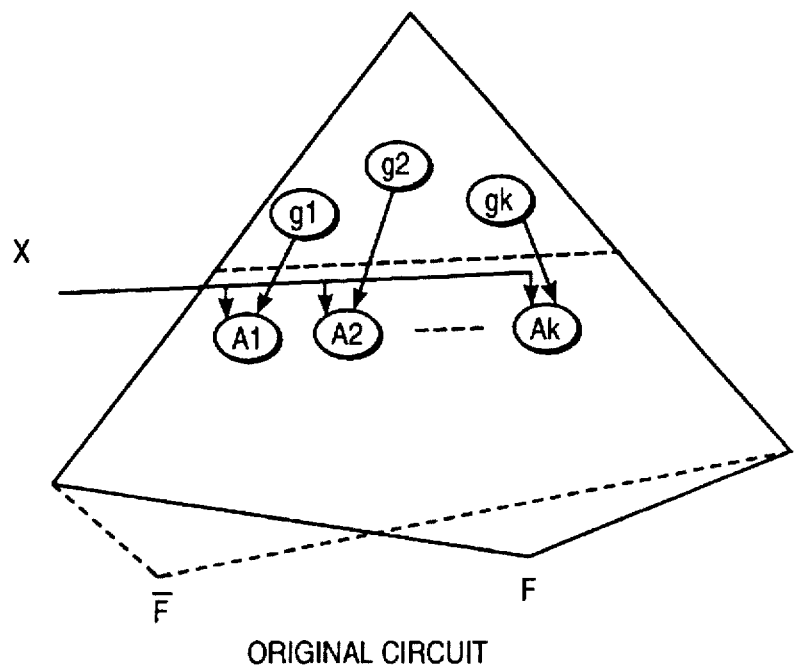
FIG. 4A illustrates the distribution of a primary input lead x into a hypothetical circuit.

FIG. 4A illustrates the distribution of a primary input lead x into a hypothetical circuit. It should be understood that, depending on the configuration of the initial starting circuit and the power analysis of that circuit, at least one conditional selection circuit can be associated with each primary input lead x. With an initial starting circuit of modest complexity as is illustrated in FIG. 3, a resulting circuit configuration with conditional selection circuits for each primary input leads is difficult to adequately illustrate thus, only one primary input lead x is illustrated. Others primary input leads could be used for the herein disclosed techniques.

Figure 4B:
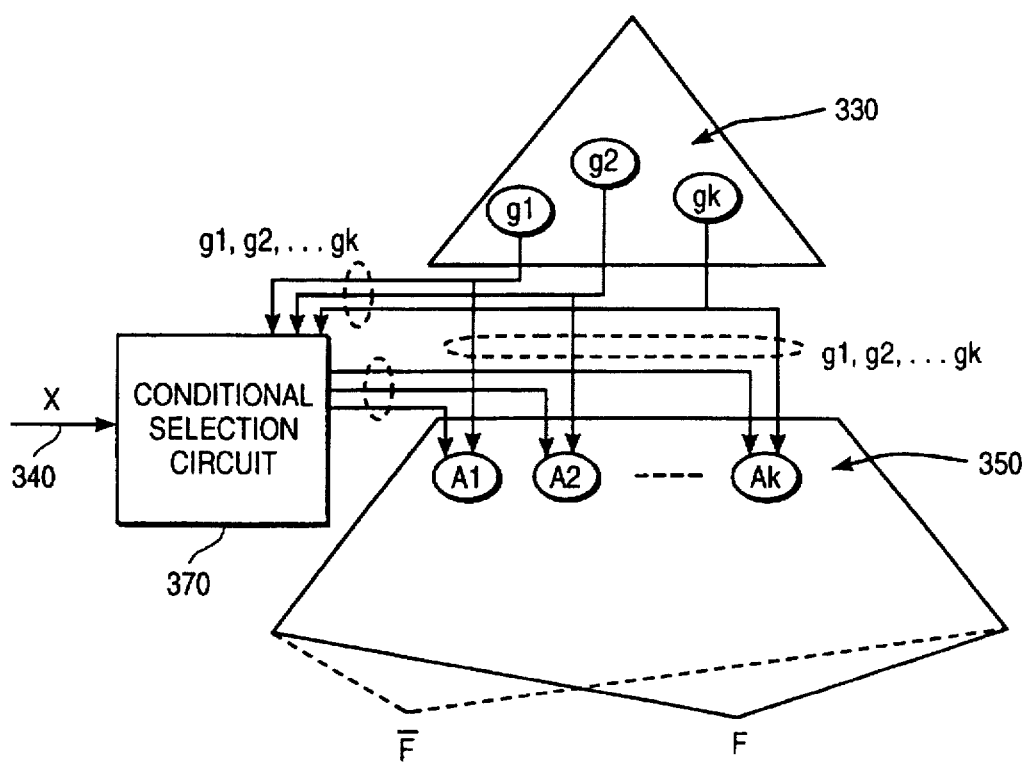
FIG. 4B illustrates the concept of a conditional selection circuit of the present invention.

FIG. 4B illustrates the concept of a conditional selection circuit of the present invention. The conditional selection circuit preferably takes inputs that are the output edges associated with the gates $g_1, \ldots g_k$, 330, and a single primary input lead x, 340, and then fans-out x to a set of AND-gates A1, ... Ak, 350.

Figure 5:
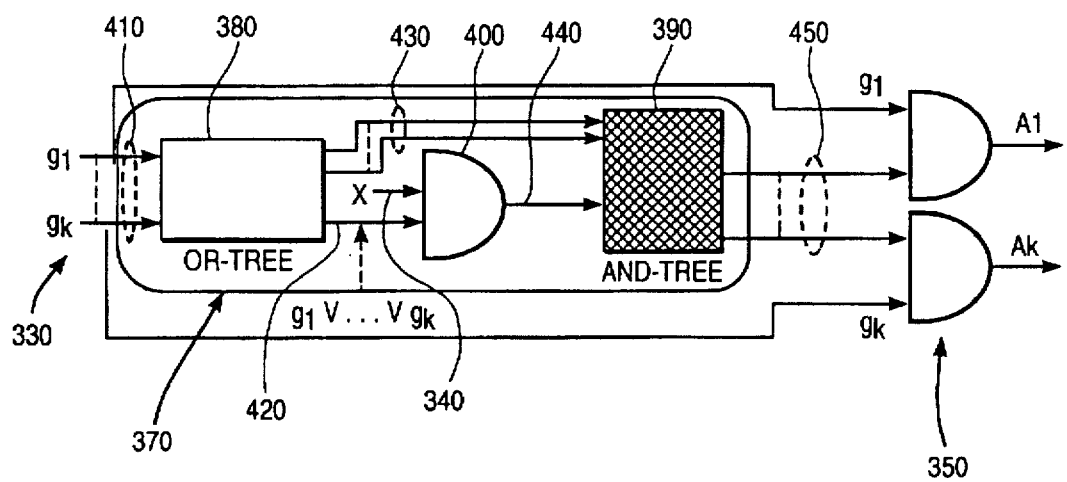
FIG. 5 illustrates the internal workings of the conditional selection circuit of using the example in FIG. 4B.

FIG. 5 illustrates the internal workings of the conditional selection circuit of using the example in FIG. 4B. The conditional selection circuit 370 is inserted between the outputs $g_1, \ldots g_k$ at 330 from the initial starting circuit and the set of AND-gates A1, ... Ak at 350. In the preferred embodiment, the conditional selection circuit 370 preferably consists of two separate sub-circuits. These are an OR-Tree sub-circuit 380 and an AND-Tree sub-circuit 390 separated by at least one AND-gate 400. Sub-circuit 380 comprises a minimum weighted binary tree accepting the set of signals $g_1, \ldots g_k$ which are then OR'ed together based upon the associated 1-controllability factors. The OR-tree sub-circuit generates an output $g_1 \vee g_2 \vee \ldots g_k$ 420, and outputs on lines 430 corresponding to the individual out-edges of each of the OR-gates in the OR-Tree. The output $g_1 \vee g_2 \vee \ldots g_k$ 420 of the OR-tree sub-circuit is directed into a single AND-gate 400. The other input to AND-gate 400 is primary input lead x 340.

The AND-Tree sub-circuit 390 takes as its input the output at 440 of the AND-gate 400, and generates, as output, $x \wedge g_j$ for j=1 to k. The AND-tree sub-circuit 390 is preferably an inverted tree of AND-gates. The outputs 450 of sub-circuit 390, along with $g_1, \ldots g_k$ 410, are then connected back into the original circuit at A1, ... Ak 350.

Figure 6:
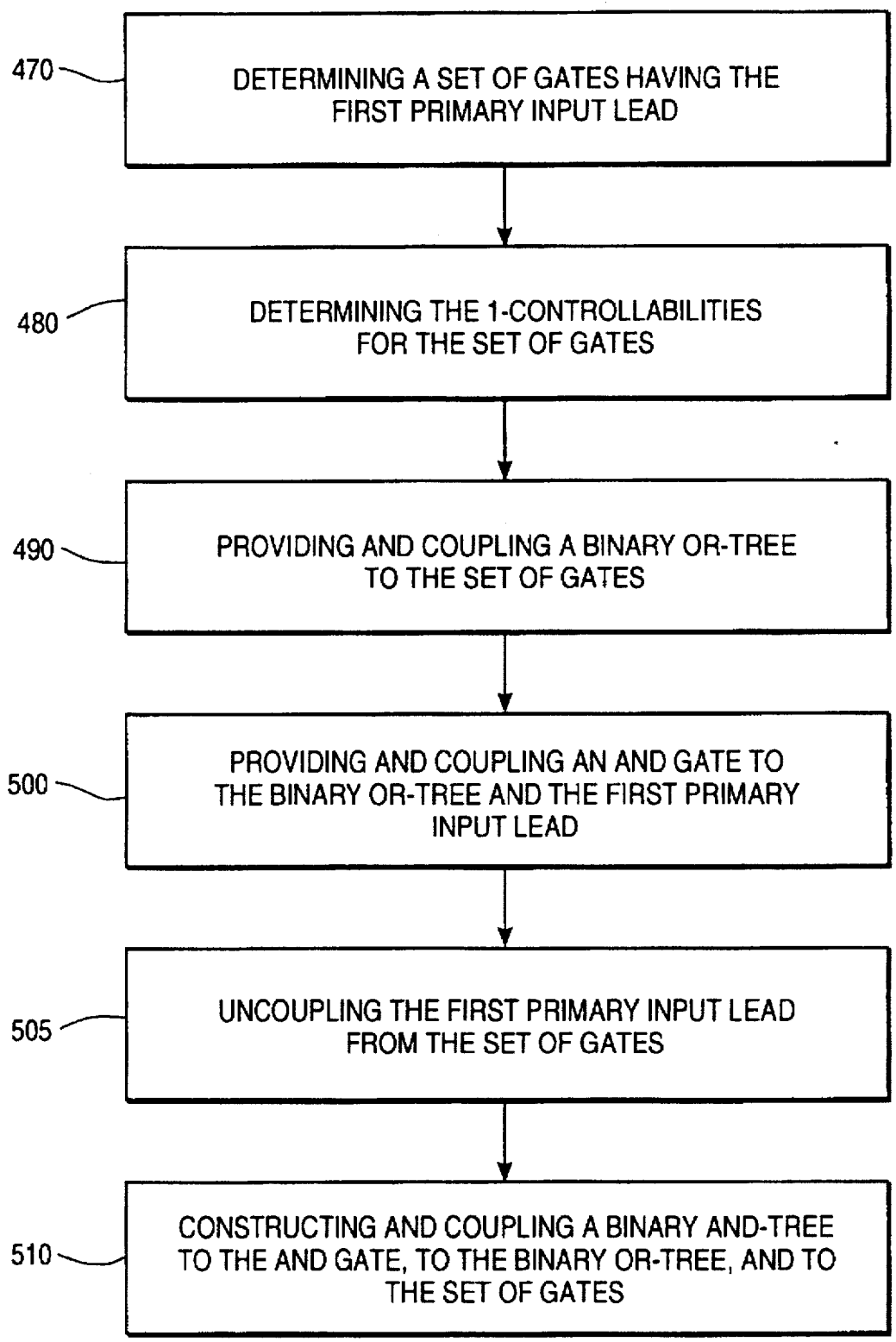
FIG. 6 illustrates a flow diagram of one embodiment of the process of reducing the power consumed by the charging of primary input leads into a circuit.

FIG. 6 illustrates a flow diagram of one embodiment of the process of reducing the power consumed by the charging of primary input leads into a circuit.

In the preferred embodiment of the present invention, given a circuit preferably derived from a Shannon graph, set of gates having the same primary input lead are determined, step 470. Next, the 1-controllabilities for the set of gates are determined, step 480. Based upon the 1-controllabilities for the set of gates in the preferred embodiment, a binary OR-tree provided and coupled to the set of gates starting from the gates having the lowest 1-controllability to the gates having the highest 1-controllability, step 490. An AND gate is then provided coupled to the output of the OR-tree and the primary input lead, step 500.

In the next step, the first primary input lead is uncoupled from the set of gates, step 505. Based upon inputs from the binary OR-tree and the AND gate, an AND-tree is constructed and coupled to the set of gates, in the preferred embodiment, starting from the gates having the highest 1-controllability to the gates having the lowest 1-controllability, step 510.

Further description of the steps above is given in conjunction with the following example.

EXAMPLE

The initial starting circuit of FIG. 3 was derived from the Shannon graph of FIG. 1 by an application of the techniques disclosed in the related patent application.

Figure 7B:
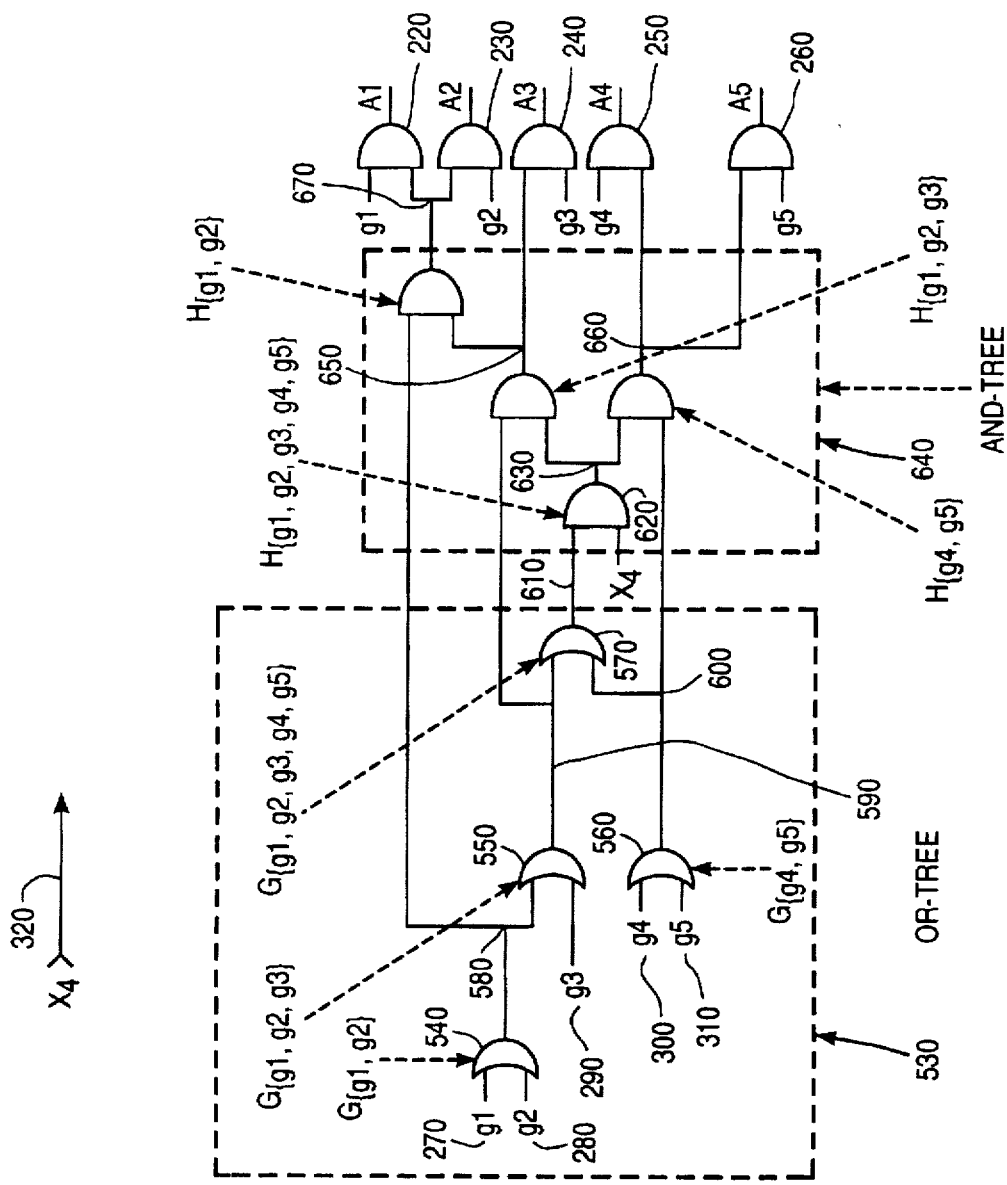
FIG. 7B illustrates a schematic of the implementation of the embodiment of the present invention as applied to the circuit of FIG. 3
Figure 7A:
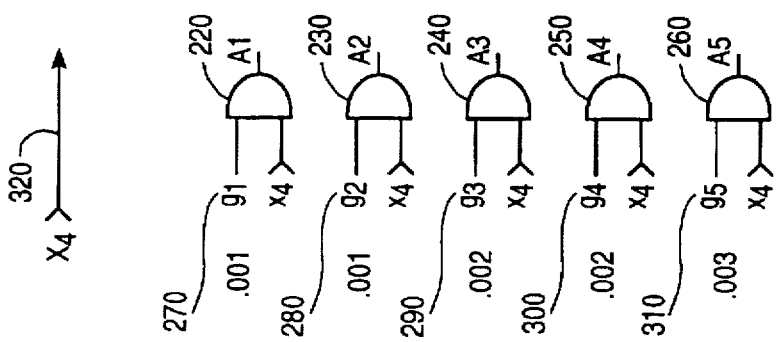
FIG. 7A illustrates a diagram of the respective gates of the initial starting circuit of FIG. 3

FIG. 7A illustrates a diagram of the respective gates of the initial starting circuit of FIG. 3 wherein the selected primary input lead $x_4$ 320 has a fanout of 5, i.e., connected to 5 AND gates, as shown. The 1-controllability factors for each of the gates $g_1, \ldots, g_5$, 270–310, respectively, are set in this example to 0.001, 0.001, 0.002, 0.002, and 0.003, respectively. It should be understood that the values provided herein are for example purposes only. The computation of the 1-controllability factors is well-known in the art.

FIG. 7B illustrates a schematic of the implementation of the embodiment of the present invention as applied to the circuit of FIG. 3. In FIG. 7B, the OR-Tree sub-circuit 530 of minimum weight using the given 1-controllability is constructed comprising a set of OR-gates 540–560 associated with $g_1, \ldots, g_5$ 270–310. The first OR-gate 540 combines $g_1$ 270 with $g_2$ 280 because these have the lowest 1-controllability factors: 0.001. The resulting 1-controllability factor for $g_1 \vee g_2$ is 0.002 (0.001+0.001). $g_1 \vee g_2$ 580 is then logically OR'ed with $g_3$ 290 because these have the next lowest 1-controllability factors: 0.002 and 0.002. Alternatively $g_1 \vee g_2$ 580 could have been logically OR'ed with $g_4$ 300 because $g_4$ 300 also has a 1-controllability factor of 0.002. The resulting 1-controllability factor for $g_1 \vee g_2 \vee g_3$ 590 is 0.004 (0.002+0.002). The next two lowest 1-controllability factors are 0.002 for $g_4$ 300 and 0.003 for $g_5$ 310, thus $g_4$ 300 and $g_5$ 310 are logically OR'ed to as shown. The resulting 1-controllability for $g_4 \vee g_5$ 600 is 0.005 (0.002+0.003). Finally, $g_1 \vee g_2 \vee g_3$ 590 is logically OR'ed with $g_4 \vee g_5$ 600. The resulting OR-Tree sub-circuit of the conditional selection circuit of the present invention has now been constructed.

The output of the OR-Tree sub-circuit, $g_1 \vee g_2 \vee g_3 \vee g_4 \vee g_5$ 610, is combined with the primary input lead $x_4$ 320 as inputs into AND-gate 620, as shown in FIG. 7B. The logical AND'ing of these two edges generates, a signal H edge 630 as shown. This edge H 630, along with the other OR'ed edges $g_1 \vee g_2$ 580, $g_1 \vee g_2 \vee g_3$ 590, and $g_4 \vee g_5$ 600 serve as inputs into the AND-Tree sub-circuit 640 as will now be described in detail.

The H edge 630 is logically AND'ed with $g_1 \vee g_2 \vee g_3$ 590, to produce $H_{123}$ 650, and the H edge 630 is logically AND'ed with $g_4 \vee g_5$ 600 to obtain $H_{45}$ 660, as shown. The output $H_{45}$ 660 is directed back into the associated AND-gates A4 250 and A5 260 along with the original inputs of $g_4$ 300 and $g_5$ 310 in correspondence with the connections of the initial starting circuit of FIG. 3. The output $H_{123}$ 650 goes directly into A3 240 along with $g_3$ 290, and the output $H_{123}$ 650 is logically AND'ed with $g_1 \lor g_2$ 580 to generate $H_{12}$ 670 which is directed into A1 220 and A2 230 along with $g_1$ 270 and $g_2$ 280. In such a manner, the AND-Tree sub-circuit has been constructed and the conditional selection circuit has been interfaced back with the original circuit at the level of the primary input lead $x_4$ 320.

CONDITIONAL POWER SAVINGS

The following provides a more intuitive explanation of the operation of and the methodology behind the conditional selection circuit of the present invention. Reference is still being made to FIGS. 3 and 7B.

If only one signal $g_i$ of the set of signals $g_1, \ldots g_k$ has a transition on it, i.e., value of 1 after setting ENABLE=1, then the primary input lead signal from x must be fed to the corresponding AND gate ($A = g_i \land x$). All the other AND gates fed by $x_j$ in the circuit do not need the value of $x_j$ since the other input of each of these gates is 0. Under different input test vectors, a different gate $g_j$ from the set $g_1, \ldots g_k$ is selected. To distribute $x_j$ only to the gates that have a transition on it, a binary tree of OR-gates is built that indicates which gate $g_i$ has a transition on it.

In a derived conditional selection circuit, if there is an OR gate $G_{12}$ with inputs $g_1$ and $g_2$ and another OR gate $G_{34}$ with inputs $g_3$ and $g_4$. If either $g_1, g_2, g_3$, or $g_4$ have a transition on it then the logical OR'ing of $G_{12}$ and $G_{34}$, $G_{1234}$ also has a transition on it. This construction can be performed starting with any number of input signals $g_1, g_2, \ldots g_k$ where $k>1$. On completion of this procedure, the final OR gate has a transition on it if any of the gates $g_1, \ldots g_3$ have a signal on it. This last OR gate is then logically AND'ed with the primary input lead x, forming a new signal H.

The next step is to determine how to transmit this new signal to replace the primary input lead signal x only to the appropriate AND gates. This distribution is achieved by building a binary-tree of AND gates that routes the new signal H to the appropriate destination, by mirroring the structure of the OR-tree. If H is logically AND'ed with $G_{12}$, defining $H_{12}$, and if H is logically AND'ed with $G_{34}$, defining $H_{34}$, $H_{12}$ will have a transition only if $G_{12}$ has a transition, and $H_{34}$ will have a transition only if $G_{34}$ has a transition on it. Next, if $H_{12}$ is logically AND'ed with $g_1$ defining $H_1$, it is realized that H1 is equivalent to A1, i.e. $H_1 = g_1 \land x$. The similar reasoning also applies to $H_2, H_3, H_4$.

In this construction the original fanout of the primary input lead x has been reduced from 4 to 1. However, this is done at the expense of increased transition activity. In general, if the fanout of the un-complemented primary input x is N, after application of the conditional selection circuit embodiment, as described above, the fanout of the un-complemented primary input lead x will be 1. The total increase in transition activity is log(N) for the OR-Tree sub-circuit and log(N) for the AND-Tree sub-circuit, since only one path is active in either tree (log(N) is the smallest integer greater than or equal to $\log_2(N)$). Note that the fanout of each gate, except the last gate of the OR-tree, is 2.

It is envisioned herein that the present invention may also be embodied as a partial conditional selection circuit. In such an embodiment, the OR-Tree sub-circuit is an OR-Forest and the primary input lead associated therewith would have a fanout equal to the number of roots of the OR-Forest.

The preferred embodiment of the present invention allows the user to determine whether or not the power consumption of the circuit can be reduced while building the OR-Tree sub-circuit, as follows. If the designated primary input lead x has a 1-controllability of $P_i$ and that the next two candidates (each may be a leaf or an OR-gate in the OR-Tree constructed up to now) to be combined form an OR-gate having weights $w_1$ and w2 and a combined weight of w. The power consumed without the conditional selection circuit of the present invention as applied is calculated below. If the primary input lead x has a fanout of 2 to these two candidates, $2p_iP$ power is consumed. The power consumed by the AND-gates is $2wp_iP$ since the gates charge and discharge AND-gates is $2wp_iP$ since the gates charge and discharge once per input test vector, with probability of $wp_i$. Thus, the power consumed due to the two candidates is $(w+1)2p_iP$. Noting that exactly one of the final two AND-gates switch and that the fanout of each candidate is increased by one due to the construction, the total power is $(2w+2w+4p_iw+2p_iw+p_i)P$. Hence, conditional selection is only applied on the two candidates when $(4w+6p_iw+p_i)P < (w+1)2p_iP$. This simplifies to the expression in equation (4).

$$w < \frac{p_i}{4+4p_i} \quad (4)$$

Since the right-hand side of equation (4) is monotonic over the interval [0,1], solving the equation produces $p_i=1.0$, i.e., the primary input lead x always switches. As such, conditional tree selection is advantageous when $w<⅛$. Note that the power analysis discussion above is on a level-by-level basis.

As an example of the efficacy of the present technique, assume that a primary input lead x has a fanout of 128 as an un-complemented signal. By an application of the above power model, this corresponds to 128 power units which is the transition activity times the fanout. After conditional selection, primary input lead x has a fanout of 1 and hence consumes 1 power unit. The conditional selection tree has $2\log_2(128)$ transitions, i.e., 14. Assuming a fanout of 2 on all gates in the conditional selection circuit, yields a total power no greater than 28 power units. Since there is one transition during the evaluating phase and another during the discharge phase, the total power consumed in a single cycle is 57 power units. Thus, as illustrated there is a significant power reduction achieved by an application of the conditional selection circuit of the present invention. A more careful analysis would also take into consideration the switching probabilities of each of the signals $g_1, g_2, \ldots g_k$ and primary input lead x.

It will be appreciated by those skilled in this particular art that the present invention can be embodied in other specific forms without departing from the spirit or essential characteristics thereof. In particular, since circuit designers of the present day design most, if not all, of their circuits on computers before reducing their designs to hardware, it is envisioned herein that the present invention will find its implementation in an electronic design automation software program embedded within a computer system. Such an embodiment is therefore to be considered within the scope of the present invention. The scope of the invention is therefore indicated by the appended claims rather than the foregoing description and all changes that come within the meaning and range of equivalents thereof are intended to be considered as being embraced within their scope.

What is desired to be secured by United States Letters Patents is:

1. A method for reducing power consumed in a circuit, the circuit having at least a first and a second primary input lead, a plurality of gates, and a plurality of edges, the method comprising the steps of:

determining a set of gates in the circuit coupled to the first primary input lead, the set of gates coupled to a set of edges;

determining the 1-controllability of each edge in the set of edges;

providing a binary OR tree to the circuit;

coupling the set of edges to the binary OR tree;

providing an AND gate to the circuit;

coupling the AND gate to the binary OR tree and to the first primary input lead;

providing a binary AND tree to the circuit;

uncoupling the first primary input lead from the set of gates;

coupling the binary AND tree to the AND gate and to the set of gates; and coupling at least one output of the binary OR tree to at least one input of the binary AND tree.

2. A method for reducing power consumed in a circuit, the circuit having at least a first and a second primary input lead, a plurality of gates, and a plurality of edges, the method comprising the steps of:

determining a set of gates in the circuit coupled to the first primary input lead, the set of gates coupled to a set of edges, wherein each of the set of gates has a first input and a second input, the first inputs of the set of gates coupled to the first primary input lead, the second inputs of the set of gates coupled to the set of edges;

determining the 1-controllability of each edge in the set of edges;

providing a binary OR tree to the circuit, wherein the binary OR tree has a plurality of inputs and a single output and a plurality of outputs;

coupling the set of edges to the binary OR tree, wherein the step of coupling the set of edges comprises coupling the set of edges to the plurality of inputs of the binary OR tree;

providing an AND gate to the circuit, wherein the AND gate has a first input and a second input;

coupling the AND gate to the binary OR tree and to the first primary input lead, wherein the step of coupling the AND gate comprises the steps of:

coupling the first input of the AND gate to the first primary input lead; and coupling the second input of the AND gate to the single output of the binary OR tree;

providing a binary AND tree to the circuit, wherein the binary AND tree has a plurality of inputs and a plurality of outputs;

uncoupling the first primary input lead from the set of gates, wherein the step of uncoupling the first primary input lead comprises uncoupling the first primary input lead from the first inputs of the set of gates; and coupling the binary AND tree to the AND gate, to the binary OR tree, and to the set of gates, wherein the step of coupling the binary AND tree comprises the steps of:

coupling the plurality of inputs of the binary AND tree to the output of the AND gate and to the plurality of outputs of the binary OR tree; and coupling the plurality of outputs of the binary AND tree to the first inputs of the set of gates.

3. The method of claim 2, wherein the step of coupling the set of edges further comprises the steps of:

determining a first edge and a second edge of the set of edges having a 1-controllability lower than other edges of the set of edges;

coupling the first edge and the second edge to inputs of the binary OR tree to form a first output of the plurality of outputs of the binary OR tree;

determining the 1-controllability of the first output;

determining a third edge and a fourth edge from the other edges and from the first output having a 1-controllability lower than remaining edges of the set of edges;

coupling the third edge and the fourth edge to inputs of the binary OR tree to form a second output of the plurality of outputs of the binary OR tree; and repeating the above steps until all edges of the set of edges are coupled to the binary OR tree to form an ordered output.

4. The method of claim 3, wherein the step of coupling the binary AND tree further comprises the step of coupling the plurality of inputs of the binary AND tree to the plurality of outputs of the binary OR tree in an order opposite of the ordered output of the binary OR tree.

5. A circuit produced in accordance with the process of claim 1.

6. A circuit produced in accordance with the process of claim 4.

7. A system for reducing power consumed in a circuit, the circuit having at least a first and a second primary input lead, a plurality of gates, and a plurality of edges, the system including a processor and a memory, the system further comprising:

an input device, coupled to the memory for inputting a Shannon graph into the memory;

means, coupled to the memory for determining a set of gates in the circuit coupled to the first primary input lead, the set of gates coupled to a set of edges;

means, coupled to the memory for determining the 1-controllability of each edge in the set of edges;

means, coupled to the memory for providing an OR tree to the circuit;

means, coupled to the memory for coupling the set of edges to the OR tree;

means, coupled to the memory for providing an AND gate to the circuit;

means, coupled to the memory for coupling the AND gate to the OR tree and to the first primary input lead;

means, coupled to the memory for providing an AND tree to the circuit;

means, coupled to the memory for uncoupling the first primary input leads from the set of gates;

means, coupled to the memory for coupling the AND tree to the AND gate and to the set of gates;

means, coupled to the memory for coupling outputs of the OR tree to inputs of the AND tree; and an output device, coupled to the processor and to the memory for outputting the circuit.

8. The system of claim 7, wherein each of the set of gates has a first input and a second input, the first inputs of the set of gates coupled to the first primary input lead, the second inputs of the set of gates coupled to the set of edges;

wherein the OR tree has a plurality of inputs and a single output and a plurality of outputs;

wherein the AND gate has a first input and a second input;

wherein the AND tree has a plurality of inputs and a plurality of outputs;

wherein the means for coupling the set of edges comprises means for coupling the set of edges to the plurality of inputs of the OR tree;

wherein the means for coupling the AND gate comprises:
means for coupling the first input of the AND gate to the first primary input lead; and
means for coupling the second input of the AND gate to the single output of the OR tree;

wherein the means for uncoupling the first primary input leads comprises means for uncoupling the first primary input leads from the first inputs of the set of gates; and wherein the means for coupling the AND tree comprises:
means for coupling the plurality of inputs of the AND tree to the output of the AND gate and to the plurality of outputs of the OR tree; and
means for coupling the plurality of outputs of the AND tree to the first inputs of the set of gates.

9. The system of claim 8, wherein the means for coupling the set of edges comprises:
means for determining a first edge and a second edge of the set of edges having a 1-controllability lower than other edges of the set of edges;
means for coupling the first edge and the second edge to inputs of the OR tree to form a first output of the plurality of outputs of the OR tree;
means for determining the 1-controllability of the first output;
means for determining a third edge and a fourth edge from the other edges and from the first output having a 1-controllability lower than remaining edges of the set of edges;
means for coupling the third edge and the fourth edge to inputs of the OR tree to form a second output of the plurality of outputs of the OR tree; and
means for employing the above means until all edges of the set of edges are coupled to the OR tree to form an ordered output.

10. The system of claim 9, wherein the means for coupling the plurality of inputs of the AND tree further comprises means for coupling the plurality of inputs of the AND tree to the plurality of outputs of the OR tree in an order opposite of the ordered output of the OR tree.

11. The method of claim 1 wherein:
the binary AND tree has a plurality of outputs; and
the step of coupling the binary AND tree to the set of gates comprises the step of coupling at least two outputs of the AND tree to the set of gates.

12. A method for reducing power consumed in a circuit, the circuit having at least a first and a second primary input lead, a plurality of gates, and a plurality of edges, the method comprising the steps of:
determining a set of gates in the circuit coupled to the first primary input lead, the set of gates coupled to a set of edges;
determining the 1-controllability of edges in the set of edges;
providing to the circuit an OR forest coupled to the set of edges;
providing AND circuitry to the circuit;
coupling the first primary input lead to the AND circuitry;
uncoupling the first primary input lead from the set of gates;
coupling the AND circuitry to the set of gates; and
coupling at least one output of the OR forest to at least one input of the AND circuitry.

13. The method of claim 12, wherein the step of providing an OR forest comprises the steps of:
determining a first edge and a second edge, from a current collection of edges that initially contains the set of edges, wherein the first edge and the second edge have a 1-controllability lower than other edges of the current collection of edges;
coupling the first edge and the second edge to inputs of the OR forest to define a new edge of a plurality of new edges in the OR forest, the new edge becoming part of the current collection of edges, and the first edge and the second edge becoming no longer part of the current collection of edges;
determining the 1-controllability of the new edge; and
employing the above three steps repeatedly, thereby forming the plurality of new edges in an order.

14. The method of claim 13, wherein
the step of providing an OR forest provides an OR forest that is a binary OR tree; and
the step of providing AND circuitry comprises the step of providing a binary AND tree.

15. The method of claim 13, wherein the step of employing the three steps comprises the steps of:
determining according to a power model an estimate regarding the amount of power which can be saved by employing the three steps once;
stopping the employing of the three steps in response to the estimate.

16. The method of claim 13, wherein the plurality of new edges in the OR forest are outputs of the OR forest, and wherein the step of coupling at least one output of the OR forest comprises the step of coupling at least two new edges of the plurality of new edges to inputs of the AND circuitry in an order opposite of the order of the at least two new edges.

17. The method of claim 12 wherein:
the AND circuitry has a plurality of outputs; and
the step of coupling the AND circuitry to the set of gates comprises the step of coupling at least two outputs of the AND circuitry to the set of gates.

18. The method of claim 12 wherein at least one logic function implemented by an output of the AND circuitry is implemented with more binary gates in the AND circuitry and OR forest than is necessary to realize the logic function.

19. A computer system for reducing power consumed in a circuit, the circuit having at least a first and a second primary input lead, a plurality of gates, and a plurality of edges, the system including a processor and a memory, the system comprising:
an input device, coupled to the memory for inputting a Shannon graph into the memory;
an output device, coupled to the processor and to the memory for outputting the circuit; and
a computer readable storage medium comprising:
code that directs the processor to determine a set of gates in the circuit coupled to the first primary input lead, the set of gates coupled to a set of edges;
code that directs the processor to determine the 1-controllability of each edge in the set of edges;
code that directs the processor to provide to the circuit an OR forest coupled to the set of edges;
code that directs the processor to provide AND circuitry to the circuit;
code that directs the processor to couple the first primary input lead to the AND circuitry;
code that directs the processor to uncouple the first primary input lead from the set of gates;
code that directs the processor to couple the AND circuitry to the set of gates; and code that directs the processor to couple at least one output of the OR forest to at least one input of the AND circuitry.

20. The computer system of claim 19, wherein the code that directs the processor to provide an OR forest comprises:
(a) code that directs the processor to determine a first edge and a second edge, from a current collection of edges that initially contains the set of edges, wherein the first edge and the second edge have a 1-controllability lower than other edges of the current collection of edges;
(b) code that directs the processor to couple the first edge and the second edge to inputs of the OR forest to define a new edge of a plurality of new edges in the OR forest, the new edge becoming part of the current collection of edges, and the first edge and the second edge becoming no longer part of the current collection of edges;
(c) code that directs the processor to determine the 1-controllability of the new edge; and
code that directs the processor to employ the above code (a), code (b), and code (c) repeatedly, thereby defining the plurality of new edges in an order.

21. The computer system of claim 20, wherein:
the code that directs the processor to provide an OR forest directs the processor to provide an OR forest that is a binary OR tree; and
the code that directs the processor to provide AND circuitry comprises code that directs the processor to provide a binary AND tree.

22. The computer system of claim 20, wherein the code that directs the processor to employ the code (a), code (b), and code (c) comprises:
code that directs the processor to determine according to a power model an estimate regarding the amount of power which can be saved by employing the code (a) and code (b) once; and
code that directs the processor to stop employing the code (a), code (b), and code (c) in response to the estimate.

23. The computer system of claim 20, wherein the plurality of new edges in the OR forest are outputs of the OR forest, and wherein the code that directs the processor to couple at least one output of the OR forest comprises code that directs the processor to couple at least two new edges of the plurality of new edges to inputs of the AND circuitry in an order opposite of the order of the at least two new edges.

24. The computer system of claim 19 wherein:
the AND circuitry has a plurality of outputs; and
the code that directs the processor to couple the AND circuitry to the set of gates comprises code that directs the processor to couple at least two outputs of the AND circuitry to the set of gates.

25. The computer system of claim 19 wherein at least one logic function implemented by an output of the AND circuitry is implemented with more binary gates in the AND circuitry and OR forest than is necessary to realize the logic function.

26. A computer program product, for a computer system including a processor and a memory, for reducing power consumed in a circuit, the circuit having at least a first and a second primary input lead, a plurality of gates, and a plurality of edges, the computer program product comprising:
a computer readable storage medium comprising:
code that directs the processor to determine a set of gates in the circuit coupled to the first primary input lead, the set of gates coupled to a set of edges;
code that directs the processor to determine the 1-controllability of each edge in the set of edges;
code that directs the processor to provide to the circuit an OR forest coupled to the set of edges;
code that directs the processor to provide AND circuitry to the circuit;
code that directs the processor to couple the first primary input lead to the AND circuitry;
code that directs the processor to uncouple the first primary input lead from the set of gates;
code that directs the processor to couple the AND circuitry to the set of gates; and
code that directs the processor to couple at least one output of the OR forest to at least one input of the AND circuitry.

27. The computer program product of claim 26, wherein the code that directs the processor to provide an OR forest comprises:
(a) code that directs the processor to determine a first edge and a second edge, from a current collection of edges that initially contains the set of edges, wherein the first edge and the second edge have a 1-controllability lower than other edges of the current collection of edges;
(b) code that directs the processor to couple the first edge and the second edge to inputs of the OR forest to define a new edge of a plurality of new edges in the OR forest, the new edge becoming part of the current collection of edges, and the first edge and the second edge becoming no longer part of the current collection of edges;
(c) code that directs the processor to determine the 1-controllability of the new edge; and
code that directs the processor to employ the above code (a), code (b), and code (c) repeatedly, thereby defining the plurality of new edges in an order.

28. The computer program product of claim 27, wherein:
the code that directs the processor to provide an OR forest directs the processor to provide an OR forest that is a binary OR tree; and
the code that directs the processor to provide AND circuitry comprises code that directs the processor to provide a binary AND tree.

29. The computer program product of claim 27, wherein the code that directs the processor to employ the code (a), code (b), and code (c) comprises:
code that directs the processor to determine according to a power model an estimate regarding the amount of power which can be saved by employing the code, (a) and code (b) once; and
code that directs the processor to stop employing the code (a), code (b), and code (c) in response to the estimate.

30. The computer program product of claim 27, wherein the plurality of new edges in the OR forest are outputs of the OR forest, and wherein the code that directs the processor to couple at least one output of the OR forest comprises code that directs the processor to couple at least two new edges of the plurality of new edges to inputs of the AND circuitry in an order opposite of the order of the at least two new edges.

31. The computer program product of claim 26 wherein:
the AND circuitry has a plurality of outputs; and
the code that directs the processor to couple the AND circuitry to the set of gates comprises code that directs the processor to couple at least two outputs of the AND circuitry to the set of gates.

32. The computer program product of claim 26 wherein at least one logic function implemented by an output of the AND circuitry is implemented with more binary gates in the AND circuitry and OR forest than is necessary to realize the logic function.

* * * * *